United States Patent [19]

Negishi et al.

[11] Patent Number: 4,969,056
[45] Date of Patent: Nov. 6, 1990

[54] APPARATUS FOR RECORDING INFORMATION ON A DISC

[75] Inventors: Ryuichi Negishi, Chichibu; Toru Okada, Kumagaya, both of Japan

[73] Assignee: Canon Denshi Kabushiki Kaisha, Chichibu, Japan

[21] Appl. No.: 77,334

[22] Filed: Jul. 24, 1987

[30] Foreign Application Priority Data

| Jul. 26, 1986 | [JP] | Japan | 61-174733 |
| Jul. 26, 1986 | [JP] | Japan | 61-174734 |
| Jul. 26, 1986 | [JP] | Japan | 61-174737 |

[51] Int. Cl.$^5$ .......................................... G11B 5/024
[52] U.S. Cl. .................................. 360/66; 360/77.03; 360/78.13
[58] Field of Search ............... 360/57, 66, 135, 75, 360/77, 78, 77.07, 77.08, 77.03, 78.13

[56] References Cited

U.S. PATENT DOCUMENTS

| 4,290,088 | 9/1981 | Beecroft | 360/75 |
| 4,371,902 | 2/1983 | Baxter et al. | 360/75 |
| 4,414,589 | 11/1983 | Oliver et al. | 36/77.08 X |
| 4,644,421 | 2/1987 | Miwa et al. | 360/66 |
| 4,660,106 | 4/1987 | Harrison et al. | 360/75 |
| 4,725,902 | 2/1988 | Oda et al. | 360/77 |
| 4,771,346 | 9/1988 | Shoji et al. | 360/66 |

FOREIGN PATENT DOCUMENTS 57-21133  5/1982  Japan .

Primary Examiner—Alan Faber
Assistant Examiner—David L. Robertson
Attorney, Agent, or Firm—Spencer & Frank

[57] ABSTRACT

In a disc storage unit capable of writing a servo signal for positioning a recording head at each track defined on a disc-shaped recording medium, data in a region between adjacent tracks are erased prior to the writing of the servo signal. The data stored on the recording medium are completely erased and then the servo signal can be written in the recording medium.

11 Claims, 9 Drawing Sheets

APPARATUS FOR RECORDING INFORMATION ON A DISC

BACKGROUND OF THE INVENTION

1. Field of the Invention

The present invention relates to a disc storage unit for writing or reading information into or from the surface of a disc-shaped recording medium such as a magnetic disc, or erasing information recorded thereon.

2. Description of the Prior Art

Known examples of disc storage units are optical disc storage units, compact disc storage units, video disc storage units, opto-magnetic disc storage units magnetic disc units.

Magnetic disc units, such as floppy disc storage units or hard disc storage units, have been widely with computer systems, word processors image processing units and so on, as external memory systems.

In the case of the magnetic disc unit, a recording medium such as a floppy disc, a hard disc or the like is rotated, while a magnetic head is displaced in the radial direction of a surface of the disc so as to be positioned at a plurality of positions displaced from each other by a predetermined pitch on the surface of the disc to write information. As a result, information tracks with a predetermined width are formed on the surface of the disc, so that the written information can be read out from the information tracks or the written information in a particular track can be erased.

There is the possibility that a track position on the surface of the disc or the position of the magnetic head may vary due to expansion or contraction caused by variations in environmental conditions, due to slight inaccuracies during disc fabrication, and so on, so that a certain amount of off-track operation (that is, a deviation of the head from its correct position) must be taken into consideration.

Therefore, in a disc storage unit in which the position of a track is controlled by an open loop control system, a guard band is defined between adjacent tracks or tunnel erasing is performed in order to minimize crosstalk between the adjacent tracks.

Meanwhile, recently there has been proposed a system for a magnetic disc storage unit for controlling the position of a magnetic head in response to a servo signal or a track servo signal recorded on both sides of each track. The servo signal is written into a surface of a magnetic disc after information recorded on the magnetic disc has been all erased prior to formatting of the magnetic disc. In this case, a formatter; i.e., a disc writer exclusively used for writing a disc has been used to write the servo signal.

In the case of a magnetic disc unit in which each magnetic disc is used in the manner described above, the position of each track can be controlled with a high degree of accuracy and furthermore the guard band can be eliminated, so that the data storage density can be increased.

However, in the case of a magnetic disc storage unit of the type described above, only a recording medium which has been formatted by a formatter exclusively for this type of disc storage unit, to record ID information and a track servo signal, can be used. It is not possible for users to format a raw disc which has not been formatted, as in a case of a conventional open loop control system type unit. In addition, the formatted disc is expensive, so that the operating cost of the recording medium is also increased.

In view of this, one might consider a magnetic disc drive unit that functions per se to write the servo signal without using a special formatter in order to write the servo signal of the type described above. In this case, no problem arises in the writing mode, but the following problem arises in the erasing mode to be accomplished prior to the writing mode.

That is, in the case of a magnetic disc drive unit of the type in which the position of the head is controlled in response to the servo signal, the tunnel erasing system is not employed in order to increase the data storage density and the track width is narrower than the track pitch. As a result, even if recorded information is erased at the normal track pitch, there remains a portion of the magnetic disc in which the recorded information has not been completely erased. Therefore, when a non-erased portion is left, there is the possibility that this portion may degrade the servo signal and recording data, both of which are to be written later.

SUMMARY OF THE INVENTION

In view of the above, it is an object of the present invention to provide a disc storage unit which completely erases information recorded on a surface of a recording disc without leaving a portion not erased prior to the recording of a servo signal.

It is another object of the present invention to provide a disc storage unit which controls the position of each track with a high accuracy so that a servo signal can be written highly accurately.

It is a further object of the present invention to provide a disc storage unit which eliminates track deviations and other adverse effects caused by variations of disc driving conditions among disc storage units by using the written servo signal in case that a disc has not been previously formatted by a formatter exclusively used for formatting a disc and that a disc is formatted, including a servo signal, by each disc storage unit used by each user.

It is yet a further object of the present invention to provide a disc storage unit which permits access to a disc which has been formatted by another unit without trouble in such a way that the writing of data into a data storage region of the disc is not prohibited due to disc driving conditions.

In the first aspect of the present invention, a disc storage unit comprises:

a recording head for writing and reading data into and from a disc-shaped rotating recording medium and for erasing data stored thereon;

carrying means for carrying the recording head in the radial direction of the recording medium; and erasure control means for controlling the carrying means in case of erasure of data stored on the recording medium in such a way that the recording head is carried to a region between adjacent tracks defined concentrically by the writing of data to erase the data stored in the region.

Here, the recording medium may be in the form of a magnetic disc and the recording head may be in the form of a magnetic head.

The erasure control means may control the carrying means in such a way that the recording head is carried stepwise to perform the erasure concentrically over the surface of the recording medium.

The erasure control means may control the carrying means to carry the recording head by a pitch smaller than the width of the track.

The erasure control means may control the carrying means to sequentially erase all of the tracks and thereafter the erasure control means controls the carrying means so that the magnetic head is placed at a region between the adjacent tracks, so that the region is sequentially erased.

The erasure control means may control the carrying means in such a way that the recording head is carried continuously to perform a spiral erasure over the surface of the recording medium.

In the second aspect of the present invention, a disc storage unit comprises:

a recording head for writing and reading data into and from a rotating disc-shaped recording medium and for erasing data stored thereon;

carrying means for carrying the recording head in the radial direction of the recording medium;

detection means for detecting the position of the recording head in the radial direction of the recording medium toward which the recording head is displaced;

servo signal recording means for recording through the recording head a track servo signal for positioning the recording head at one of a plurality of concentric tracks formed by writing data through the recording head on the recording medium; and servo signal recording control means for activating the servo signal recording means when the recording head is being carried by the carrying means and it is judged that the recording head is positioned at a position between adjacent tracks in response to the output from the detection means.

Here, a disc storage unit may further comprise erasure control means for erasing data on the recording medium by the recording head prior to the writing of the servo signal.

The erasure control means may control the carrying means to sequentially carry the recording head at a predetermined pitch.

The erasure control means may control the carrying means to carry the recording head at a pitch smaller than the width of each track, so that the recording head erases the data on the recording medium.

After the erasure control means controls the carrying means to sequentially erase all of the tracks, the erasure control means may control the carrying means to place the magnetic head at a region between the adjacent tracks to erase the data in the region and thereafter the servo signal recording control means writes the servo signal while the magnetic head is maintained in the region.

The carrying means may have a motor. The detection means may have an encoder which is mounted to the drive shaft of the motor and which has slits having a pitch corresponding to the pitch of the track, a photosensor through which the slits of the encoder pass and a plurality of slits which are disposed in front of a light receiving portion of the photosensor and are deviated from each other in the direction of the passage of the slits of the encoder. The servo signal recording means may detect each region between the adjacent tracks in accordance with variations of the level of the output signal derived from the light receiving portion when the slits of the encoder pass through the plurality of slits.

In the third aspect of the present invention, a disc storage unit comprises:

a recording head for writing and reading data into and from a rotating disc-shaped recording medium and for erasing data stored therein;

a servo signal recording means for recording through the recording head a track servo signal for positioning the recording head at one of a plurality of concentric tracks defined on the recording medium when data are written by the recording head on the recording medium;

means for judging a sector ID signal recording mode for recording through the recording head a sector ID signal representative of an address of a sector in each track;

rotational position detection means for detecting a predetermined rotational position of the recording medium; and means, responsive to an output signal from the rotational position detection means, for generating a servo gate signal which is enabled or disabled at a predetermined timing; and control means for controlling the servo signal recording means to write the servo signal while the servo gate signal is enabled in a mode in which the servo signal and the sector ID signal are written, and for writing an ID signal into a host system while the servo gate signal is disabled in the sector ID signal recording mode, and for permitting the writing of data regardless of a condition of the servo gate signal in a data writing mode.

Here, a disc storage unit may further comprise carrying means for carrying the recording head in the radial direction of the recording medium;

detection means for detecting the position of the recording head in the radial direction of the recording medium toward which the recording head is displaced; and servo signal recording control means for permitting an operation of the control means when the carrying means carries the recording head and it is judged that the recording head is positioned at a position between adjacent tracks in response to the output from the detection means when writing the servo signal.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, embodiments in which a disc storage unit in accordance with the present invention is applied to a magnetic disc storage unit will be described.

Figure 1:
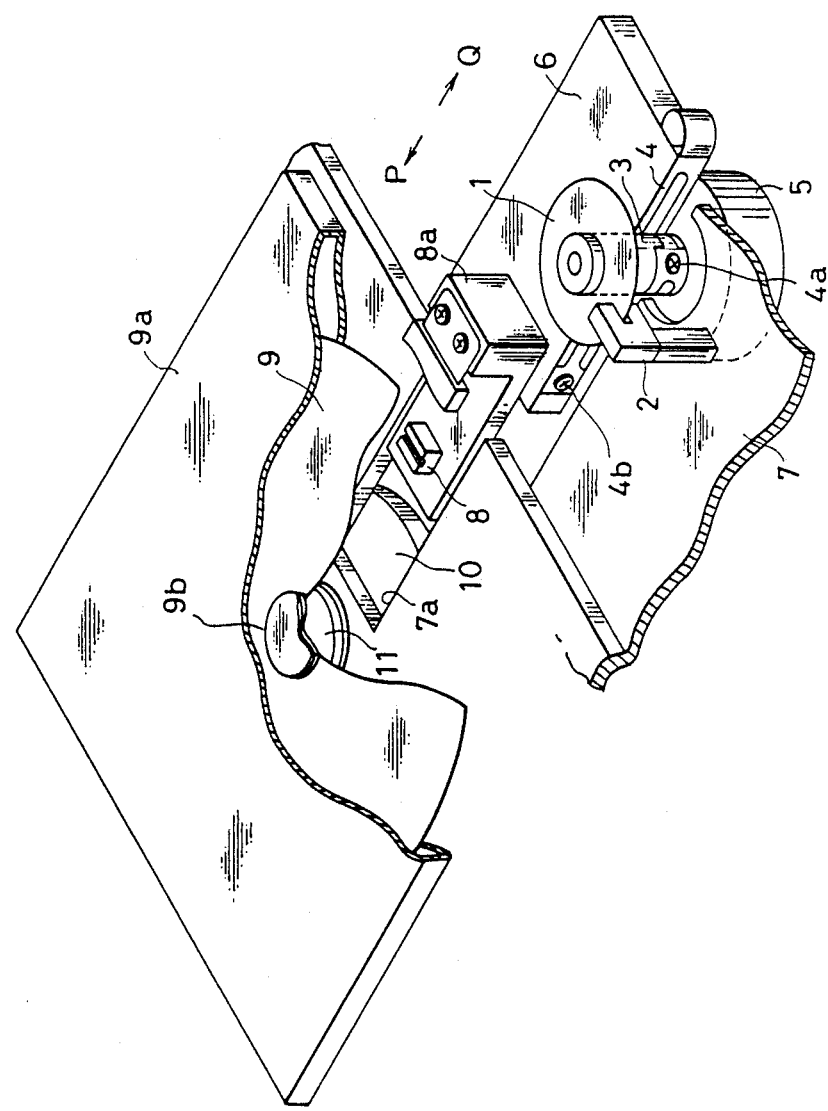
FIG. 1 is a perspective view showing an arrangement of major parts of a magnetic disc storage unit as one embodiment of a disc storage unit in accordance with the present invention.

FIG. 1 is a perspective view of a floppy disc storage unit to which the present invention is applied. In this embodiment, a magnetic disc 9 is housed in a cassette 9a. The cassette 9a is loaded to a predetermined position on a base 7 of the magnetic disc storage unit. Under the above-described condition that the cassette 9a is loaded, a center hub 9b at the center of the disc 9 comes into engagement with a spindle 11 of a motor 10 mounted to the base 7, so that the magnetic disc 9 is rotated at a predetermined (or a variable) rotational speed.

The magnetic disc 9 is exposed to the exterior through head windows (not shown) opened through the upper and lower surfaces of the cassette 9a. A rectangular opening 7a is opened through the base 7 at a position opposite the head window. The magnetic head 8 is displaced along the opening 7a to be properly positioned at a track having a predetermined radius.

In FIG. 1, only the lower magnetic head 8 is shown, while an upper magnetic head is not shown. The lower magnetic head 8 is secured to a head holder 8a which is slidably fitted into the opening 7a of the base 7. The head holder 8a is fixed to a carriage 6. A steel belt 4, one end of which is securely fixed to one side surface of the carriage 6 with a screw 4b, is wrapped around a drive shaft 3 of a motor 5 such as a stepping motor 5, and one portion of the steel belt is securely fixed to the drive shaft 3 with a screw 4a. As a result, when the motor 5 rotates by a predetermined amount, the carriage 6 is displaced by the steel belt 4 in the axial direction P or Q in the opening 7a.

An encoder plate 1 in the form of a disc is mounted to the upper end of the, drive shaft 3 of the motor 5 and has slits for detecting the absolute position of the carriage 6 and hence the magnetic head 8 with a predetermined degree of resolution. These slits can be detected by a sensor 2 utilizing a photocoupler.

Figures 2A, 2B:
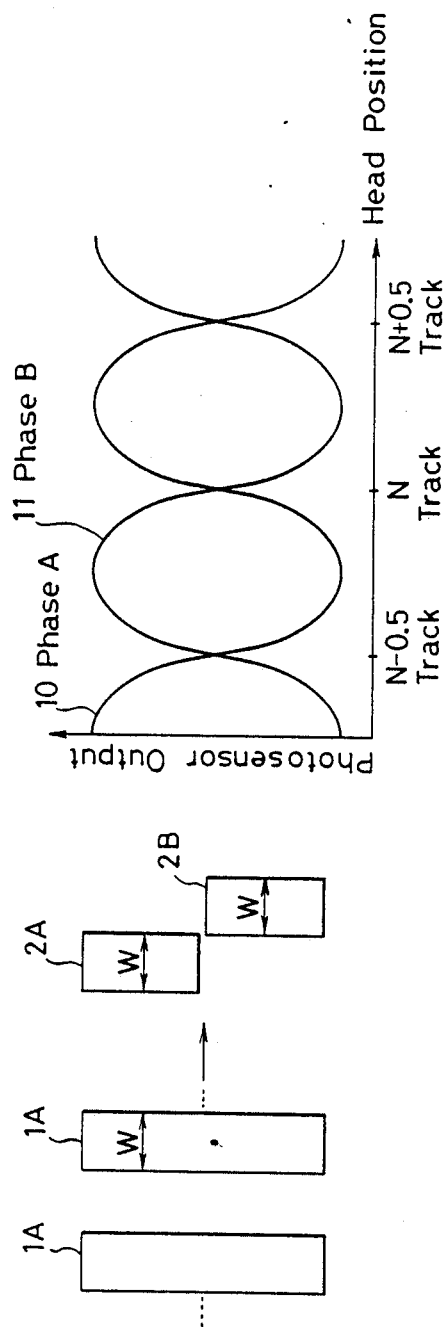
FIG. 2A is an explanatory diagram used to explain slits of an encoder and a photosensor arranged in the unit shown in FIG. 1.
FIG. 2B illustrates the output waveform of the photosensor.

Referring next to FIG. 2A, a detection system having the encoder plate 1 and the photosensor 2 shown in FIG. 1 will now be explained. In FIG. 2A, reference numeral 1A denotes a slit of the encoder plate 1. The slits 1A are so arranged as to pass over slits 2A and 2B of a slit plate mounted to the photosensor 2. The slits 2A and 2B are located, for instance, in front of two light receiving elements, respectively, of the photosensor 2. The width W of the slits 2A and 2B is equal to the width W of the slit 1A of the encoder plate 1. The slits 2A and 2B are shifted from each other by one half of the pitch of the slit 1A in the direction that the slits 1A are moved.

When the light source of the photosensor 2 is turned on, and the motor 5 is energized, the photosensor 2 outputs phase A and phase B output signals 10 and 11 obtained, respectively, from the slits 2A and 2B, as shown in FIG. 2B. These output signals have a quasi-sinusoidal waveform and are out of phase by 180° C. relative to the above-mentioned slit positions.

On the other hand, the slit pitch of the encoder plate 1 is so determined that every time that the magnetic head 8 moves from one track to the following track, one slit 1A passes through the photosensor 2.

Figure 3:
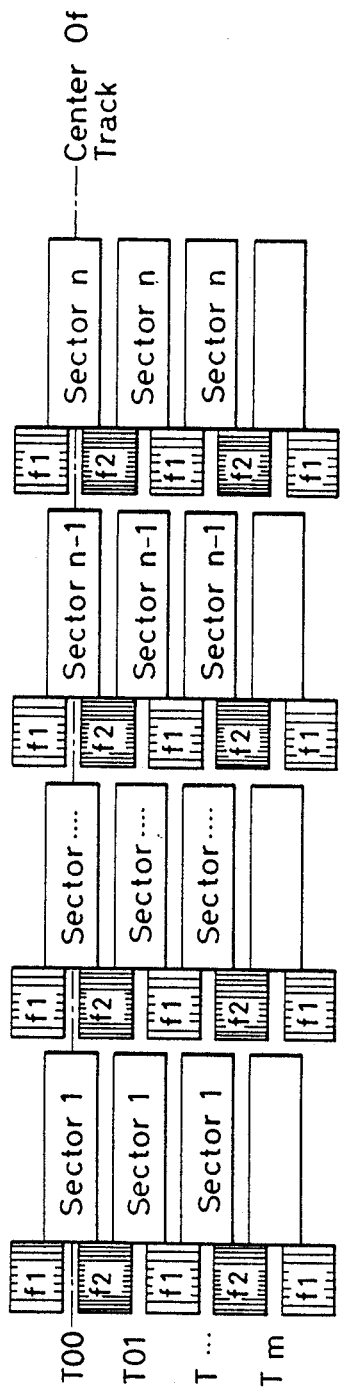
FIG. 3 is an explanatory diagram used to explain a recording format on the surface of a magnetic disc as a recording medium.

A recording format of the magnetic disc 9 can be defined as shown in FIG. 3. As shown in FIG. 3, the magnetic disc 9 has m tracks T00-Tm. Each track has n sectors 0-n. The respective sectors are distinguished from each other by sector ID information (not shown) in a conventional manner. In addition, track servo information having a recording frequency $f_1$ or $f_2$ is written in an area between the adjacent sectors of each track in such a manner that the area for the track servo information having frequency $f_1$ and the area for the track servo information having frequency $f_2$ are alternately arranged and are shifted from each sector by a distance equal to one half pitch between the vertically adjacent sectors upwardly and downwardly.

The servo track information having two frequencies $f_1$ and $f_2$ on both the sides of each track is read out by the magnetic head 8 and is detected by tuned circuits each having a corresponding frequency. The levels of the track servo signals thus detected are compared with each other.

When the magnetic head 8 is positioned at the center line of a certain track, the reproduced levels of the two servo information signals having the frequency $f_1$ and $f_2$ become equal to each other, since the areas having the servo information signals are shifted from the sectors in each track by one half the pitch of the track. When one of the reproduced levels of the servo information signals is higher than the other, it is judged that the magnetic head 8 is not correctly positioned at the center line of the track, so that the magnetic head 8 is displaced in such a direction that the reproduced levels become equal to each other. As a result, the magnetic head 8 is correctly positioned at the center line of that track.

Further, as shown in FIG. 3, because the servo information signals having the frequencies $f_1$ and $f_2$, respectively, are alternately arranged, a moving direction of the magnetic head 8 is so controlled that the direction is reversed in an even-numbered track and in an odd-numbered track, depending upon the magnitudes of the servo information signals.

Figure 4:
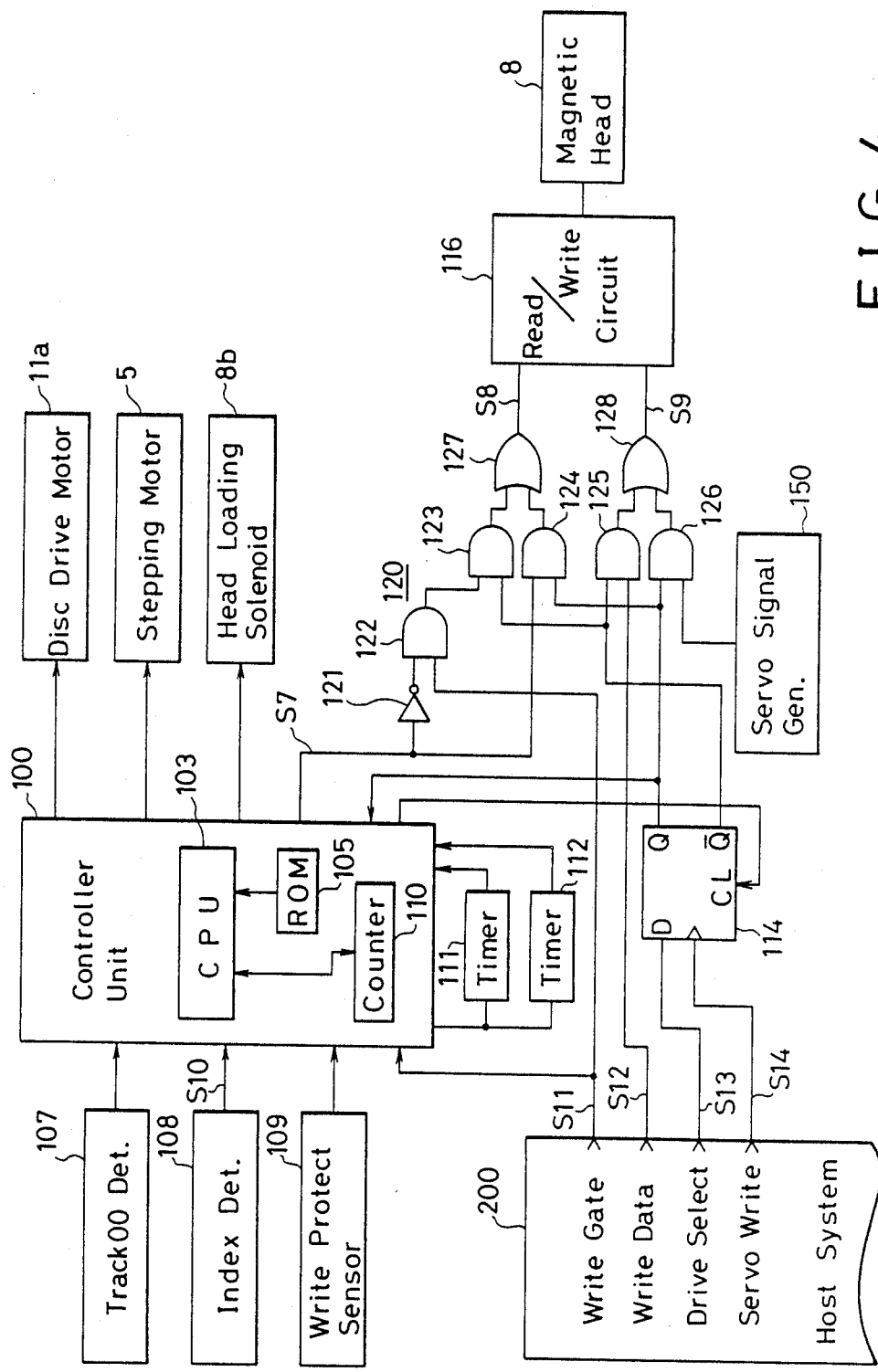
FIG. 4 is a block diagram showing an embodiment of a writing control system applicable to the unit shown in FIG. 1.

FIG. 4 is a block diagram showing one embodiment of a control system applicable to the magnetic disc unit shown in FIG. 1 and mainly shows a writing control system which constitutes a major portion of the present invention.

Figure 5:
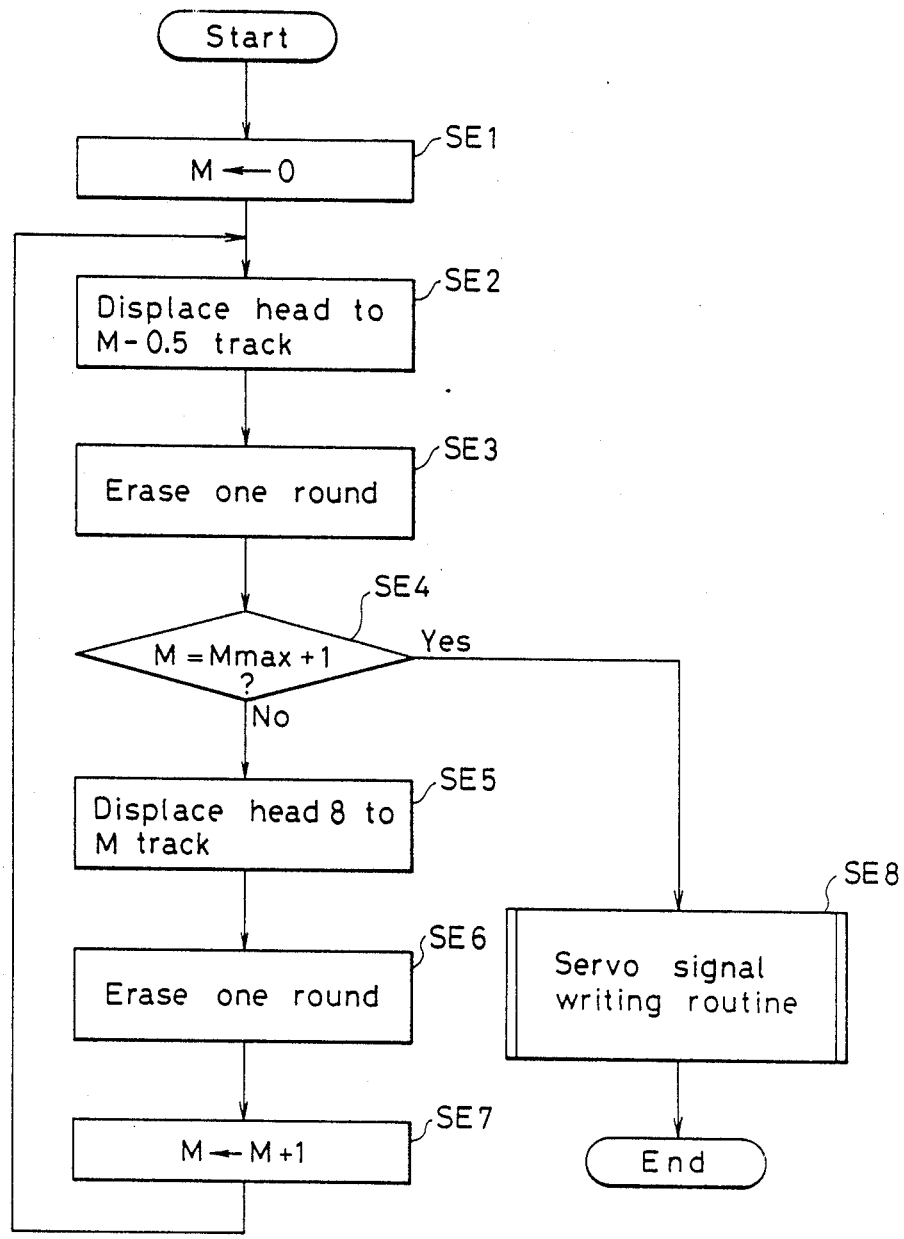
FIG. 5 is a flowchart illustrating an erasure sequence accomplished prior to the writing of the servo signal by the control system shown in FIG. 4.

In FIG. 4, reference numeral 100 denotes a controller unit which controls writing and reading operations performed by the magnetic disc unit in accordance with the procedure shown in FIG. 5. The controller unit 100 may comprise a central processing unit 103 in the form of a microprocessor chip and a read only memory 105 storing therein a program corresponding to the sequence shown in FIG. 5. The writing control by the controller unit 100 is performed in accordance with a timing of an index signal S10 generated by an index detector 108 when the index detector 108 detects an index hole of the magnetic disc 9.

A disc driving motor as a driving source of the spindle 11 for rotating the magnetic disc 9 shown in FIG. 1, the stepping motor 5 as a driving source for driving a seek mechanism including the steel belt 4 and the magnetic head 8 so as to move the magnetic head 8 in the radial direction of the disc, and a head loading solenoid as a driving source for a head loading mechanism for loading the magnetic head 8 on the magnetic disc 9, are connected to the controller unit 100 through respective drivers (not shown).

Furthermore, a track 00 detector 107 for detecting the position of the outermost track T00 of, the magnetic disc, the index detector 108 for detecting the index hole of the magnetic disc 9, a write protect sensor 109 for detecting whether or not the writing of data onto the surface of the magnetic disc 9 is inhibited, and other conventional sensors (not shown) are connected to the controller unit 100.

Furthermore, a read/write circuit 116 is conneced to the controller unit 100 via a gate circuit group 120, which will described in detail below The read/write circuit 116 amplifies a signal read out from the magnetic disc 9, demodluates the readout data, modulates and amplifies writing data and amplifies an erase signal.

The controller unit 100 with the above-described arrangement responds to commands and data from a host system 200 such as a computer to control the disc driving motor 11a, the stepping motor 5 and the head loading solenoid 8b in accordance with the outputs from the sensors 107–109, so that the magnetic head 8 writes or reads out the data into or from the surface of the magnetic disc 9, or erases the data stored thereon.

In this embodiment, in addition to the above arrangement, there is provided an arrangement for instructing a command for a writing of the above-described servo signal for controlling the position of the magnetic head 8 to the controller unit 100 from the host system 200. In response to the command, the controller unit 100 erases all the data stored on the surface of the magnetic disc 9 and then writes the servo signal thereon.

Next, the signals from the host system 200 and means for processing these signals will be described in detail hereinafter. The position of the magnetic head 8 in the erasing mode is controlled in response to the content in a counter 110 disposed in the controller unit 100 and for counting the ordinal number of tracks. The counter 110 may be provided as hardware in the controller unit 100. Alternatively, the counter 110 may be in the form of a software counter in which the function of the counter 110 is implemented by software.

Signals S11, S12 and S13 derived from the host system 200 are a write gate signal, a write data signal and a drive select signal, which are usually used in a conventional disc storage unit The write gate signal S11 is a signal for enabling the writing of write data (or a write signal) S12. The drive select signal S13 selects this disc storage unit among a plurality of disc storage units connected to the host system 200 to enable reading/writing with respect to this disc storage unit.

In this embodiment, in addition to the above-described signals, a servo write signal S14 is used to control the recording of the track servo signal. The drive select signal S13 is applied to a data input terminal of a D flip-flop 114, while the servo write signal 14 is applied to a clock terminal of the D flip-flop 114.

The above-mentioned four signals S11–S14 are applied to the gate circuit 120. The controller unit 100 controls the gate circuit 120, so that a write switching signal S8 and a writing signal S9 are derived from the output terminals of the gate circuit 120; that is, from the output terminals of OR gates 127 and 128. Both of the write switching signal S8 and the writing signal S9 are applied to the read/write circuit 116 which accomplishes the writing operation through a conventional disc recording system when the write switching signal S8 is rendered to a high level.

The track servo signal, which is generated by a servo signal generator 150, is applied as write data (the writing signal S9) to the read/write circuit 116.

Next, the arrangement of the gate circuit 120 will be described in detail. Gates 122–128 each have first and second input terminals. The inverted output signal derived from a flip-flop 114 is applied to the first input terminals of AND gates 123 and 125, and the non-inverted output signal derived from the flip-flop 114 is applied to the first output terminals of AND gates 124 and 126. Of the above-mentioned AND gates, the AND gates 124 and 126 determine whether or not the servo gate signal S7 derived from the controller unit 100 and the servo signal derived from the servo signal generator 150 are passed in response to the inverted output derived from the flip-flop 114.

The inverted signal obtained by inverting the servo gate signal S7 by the inverter 121 and the write gate signal S11 are applied to the input terminals of the AND gate 122, so that the logical product signal is obtained from the AND gate 122 and is applied to the second input terminal of the AND gate 123 The write data signal S12 is applied to the second input terminal of the AND gate 125, so that the input of write data is controlled by the AND gate 125.

The write gate signal S11 and the non-inverted output signal derived from the flip-flop 114 are applied to the controller unit 100 and in response to these signals the control operation is carried out, as will be described later. Timers 111 and 112 are connected to the controller unit 100 to control the writing operation, as will be described in detail below Count times T1 and T2 are set by the timers 111 and 112, respectively.

FIG. 5 shows an example of an erasure sequence to be performed prior to the formatting of the magnetic disc 9 by writing the servo signal.

In response to the write command of the servo signal, i.e., in response to the leading edge of the Q output from the flip-flop 114 when the servo write signal S14 is applied to the flip-flop 114 from the host system 200, the controller unit 100 starts the sequence shown in FIG. 5.

First, in step SE1, the count content M in the counter 110 is reset to zero. In step SE2, the magnetic head 8 is displaced radially outwardly to the M−0.5 track, i.e., in case of the first execution of step SE2, from −0.5 track, that is, the magnetic head 8 is displaced radially outwardly from the outermost track 00 by 0.5 track pitch.

In step SE3, the erasure is made for one round or rotation (or plural rounds) at the position determined in the preceding step SE2.

In this case, the position of the magnetic head 8 is controlled by a closed loop control system in which the number of steps of the driving signal of the stepping motor 5 is counted and the position of the magnetic head 8 is detected by the encoder unit having the above-mentioned encoder plate 1 and the photosensor 2.

The two output levels 10 and 11 derived from the two photosensors 2 become equal to each other at the normal track position and at the positions radially inwardly or outwardly displaced from the normal position by one half track pitch. By utilizing this fact, the magnetic disc 8 can be positioned over the surface of the head 9 with a high accuracy of one half track pitch by monitoring both the number of drive steps of the motor 5 and the output from the photosensors 2. A fine adjustment of the position of the magnetic head 8 in accordance with a feed amount less than one step of the motor 5 can be accomplished by varying the balance of the currents flowing through exciting phases of the motor 5 as is well known to those skilled in the art. The operations of displacing the magnetic head 8 by an extremely small distance and of comparing the outputs derived from the two photosensors 2 are repeated to move the magnetic head 8 to a desired track position and when the two outputs from the two photosensors 2 coincide with each other, the driving current of the motor 5 is fixed. Under these conditions, the erasure process is accomplished prior to the writing of the servo information signals.

Subsequently, in step SE4, it is detected whether or not the counted number M is equal to the ordinal number of the innermost track plus 1; that is, $M_{max}+1$.

If it is found that the counted number M has not become equal to $M_{max}+1$, the magnetic head 8 is displaced to the track M at step SE5 That is, the magnetic head 8 is displaced radially inwardly by one half track pitch from the erasing position determined in step SE3. That is, in the first case, the magnetic head 8 is displacet to track 00.

Thereafter, in step SE6, an erasure is made for one round (or plural rounds) and then in step SE7 the content in the counter 110 is incremented Next, the sequence returns to step SE2 and the loop consisting of steps SE2-SE7 is repeated.

Due to this repeated sequence, the magnetic head 8 is displaced radially inwardly over the surface of the magnetic disc 9 by one half track pitch sequentially, so that erasure is made at this displaced position by one round (or plural rounds).

When the erasure progresses up to the position displaced radially inwardly of the innermost track by one half track pitch and, when $M=M_{max}+1$ in step SE4 in the loop SE2-SE7, the sequence enters step SE8 from step SE4 and the servo signal is written Then, the control is terminated. The servo signals are written into both regions adjacent to each track, as will be described in more detail below, by calling a sequence shown in FIG. 6, including step SE8.

As described above, prior to the writing of the servo signal, an erasing operation is conducted as the magnetic head 8 is moved from the position radially outwardly spaced apart from the outermost track by one half track pitch to the position spaced apart radially inwardly from the innermost track by one half track pitch. In general, the track width of the magnetic head 8 is selected to be of the order of 2/3 of one track pitch and thus is wider than one half track pitch. Therefore, in the case of the erasure process in which erasure is made by one or more rounds, the radially outward side edge portion of each erasure region to be erased is overlapped with the radially inward side edge portion of the outer erasure region that has been erased. As a result, there exists no gap between the adjacent erasure regions to be erased and therefore no region is left non-erased.

That is, according to the above-mentioned process, the servo signal is written after erasure has been completely made without a portion left non-erased, and so it is ensured that deterioration of the servo signal and data written after writing of the servo signal due to non-erasure can be substantially eliminated.

Figure 6:
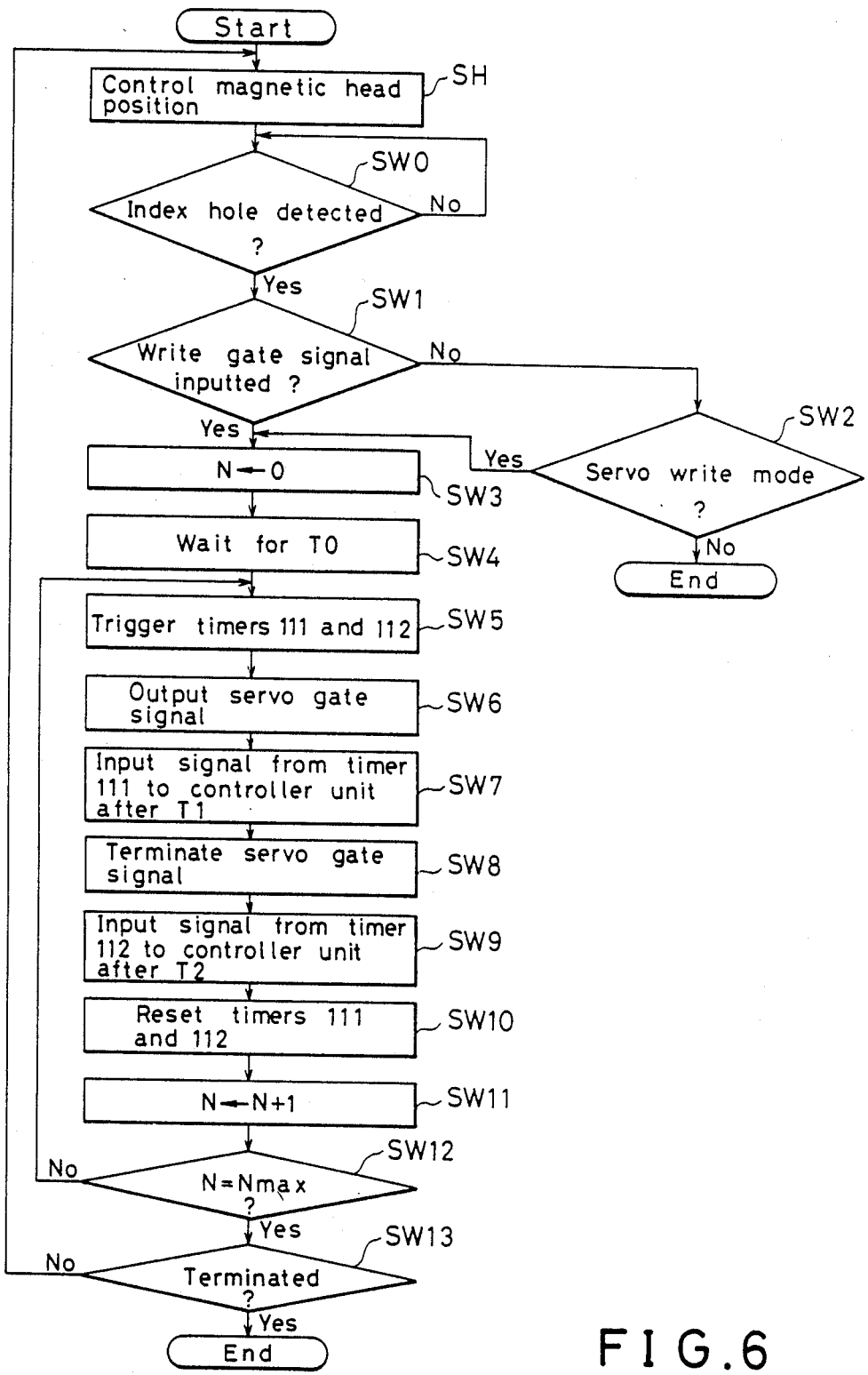
FIG. 6 is a flowchart illustrating an example of a sequence in the case of recording a servo signal and writing the ID by the control system shown in FIG. 4.

FIG. 6 shows one example of a control sequence for recording the track servo signal or writing ID. In the case of writing the servo signal, the sequence shown in FIG. 6 is executed as step SE8 in FIG. 5.

In step SH, like step SE2 in FIG. 5, the magnetic head 8 is positioned at a desired track $M+0.5$ or $M-0.5$. When the processing in the servo signal recording mode is initiated, the magnetic head 8 is positioned at a position spaced part from the outermost track 00 by 0.5 track pitch radially inwardly or outwardly, after the content M of the counter 110 is reset to zero. Like the erasure mode described above with reference to FIG. 5, in the servo signal recording mode, the position of the magnetic head 8 is controlled by the encoder unit including the encoder plate 1 and the photosensors 2. In the ID writing mode, the position of the magnetic head 8 is controlled in response to the servo signal, which has been previously recorded.

That is, in the sector ID writing mode, like the usual writing or reading mode, the magnetic head 8 is not positioned by the encoder plate 1 and the photosensors 2. In this case, the magnetic head 8 is positioned by detecting the servo information over the surface of the magnetic disc 9 and by monitoring the number of drive steps of the motor 5.

In order to move the magnetic head 8 to a predetermined track position over the surface of the disc 9, the motor 5 is first rotated by a predetermined number of steps so that a coarse adjustment of the position of the magnetic head 8 on the proper track is made. Thereafter, under this condition, when the servo information having the frequencies $f_1$ and $f_2$, is reproduced, a combined output of the two frequencies is derived from the magnetic head 8. The two frequency components are separated from each other by a tuned circuit and then the levels of the components are compared with each other In response to a difference signal obtained by the above-mentioned comparison, a fine control of the motor 5 is made so that the magnetic head 8 is positioned correctly at a normal track.

According to the above-described arrangement, as the track servo information is being written on the surface of the magnetic disc 9, the magnetic head 8 is displaced under the closed loop control in response to the detection of the magnetic head 8. Therefore, according to the present invention, the servo information can be written with a high accuracy which was heretofore unattainable by a conventional open loop controlled magnetic disc storage unit. As a result, the variations of servo information written by various user units can be minimized, so that a high degree of interchangeability is ensured in case of writing or reading.

In the case of the ID writing mode or the usual recording or reading mode, the position of the magnetic head is controlled in response to the servo information written on the surface of the magnetic disc, so that a high degree of interchangeability can be ensured in both the recording and reproduction modes, even when the magnetic disc is expanded or shrunk due to temperature and humidity.

Therefore, a raw disc can be formatted by each user unit without using a special formatter, so that the present invention has the advantageous effect that the cost of the recording medium can be decreased.

After the magnetic head 8 has been positioned in the manner described above, in step SWO of FIG. 6 the program waits for the index hole detection signal S10 to be generated by the index detector 108. In response to the generation of the index hole detection signal S10, the following sequence proceeds. In step SW1, the controller unit 100 judges whether or not the write gate signal S11 is received. If no write gate signal 11 is received in step SW1, it is judged whether or not the unit is in the servo write operation mode in step SW2. If the write gate signal S11 is received, the sequence directly advances to step SW3. When the unit is found not to be in the servo write operation mode in step SW2, the above-described sequence is terminated and the process usually enters a data write mode or the like (not shown).

In step SW3, a predetermined counted value N having the upper limit $N_{max}$ corresponding to the number n of sectors is initialized to zero.

In step SW4, the controller unit 100 waits for a time interval T0 until the index hole detection signal S10 is turned off and thereafter the sequence proceeds to step SW5 in which the timers 111 and 112 are triggered.

Figure 7:
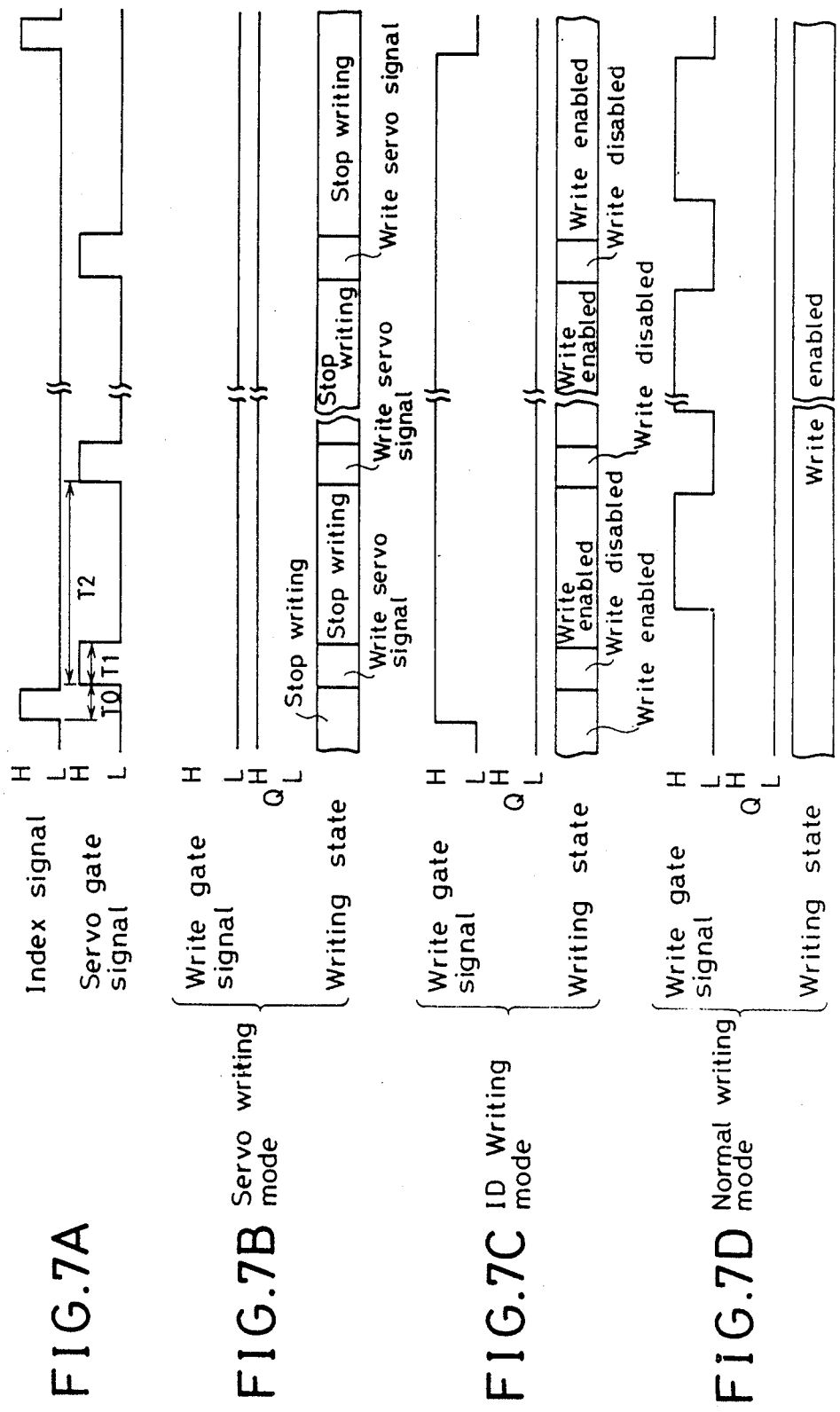
FIGS. 7A-7D are timing charts used to explain operations in the servo signal recording mode, the ID writing mode and the normal writing mode performed by the control system shown in FIG. 4.

In step SW6, the servo gate signal S7 is outputted as shown in FIG. 7A. The interval of the servo gate signal S7 is controlled to be equal to a predetermined time interval T1 set by the interval timer 111. In response to a signal representative of the expiration of the predetermined time interval T1 set by the timer 111, the servo gate signal S7 is terminated in step SW8. Thus, the timing of the servo gate signal S7 is determined.

In step SW9, a signal representative of the expiration of the predetermined time interval preset by the timer 112, which is longer than the time interval set by the timer 111, is received, and in response to this signal both the timers 111 and 112 are reset in step SW10.

In step SW11, the counted value N is incremented by one and then in step SW12 the program returns to step SW5, if the counted value N has not reached a predetermined counted value $N_{max}$ corresponding to the number of sectors. Thereafter, the above-described steps are repeated, so that, as indicated in FIG. 7A, the servo gate signal S7 with a pulse duration T1 is repeatedly generated $N_{max}$ times at a pulse interval T2.

In step SW12, when it is judged that the counted value N has reached the predetermined counted value $N_{max}$, the sequence proceeds to step SW13. In step SW13 whether or not the sequence is to be terminated is determined. More particularly, in the servo signal recording mode, if the writing of the servo signal is not completed, for instance, at a region spaced apart radially inwardly from the innermost track Tm by 0.5 track pitch, the program returns to step SH. However, when the writing of the servo signal is completed, the sequence is terminated.

Under the control by the controller unit 100, the write gate signal S11 and the servo write signal S14, the writing operation is carried out as follows. In the following example, the servo write mode indicated in FIG. 7B and the ID write mode indicated in FIG. 7C are controlled by the sequence just described above with reference to FIG. 6. In this case, the track servo signal and the sector ID signal are written between the sectors of each data track. In the mode where the track servo signal is written at each data track when formatting, the gates are controlled as follows.

As indicated FIG. 7B, when the drive select signal S13 is at a high level (H) so that this disc storage unit is selected by the host computer 200, and when the flip-flop 114 receives the servo write signal S14 and thus is set, the write mode becomes the servo write mode.

Under the above-mentioned conditions, when the servo gate signal S7 is inputted as indicated in FIG. 7A, the AND gate 126 is opened, so that the output from the servo signal generator 150 is transferred as the write signal 9 to the read/write circuit 116 through the OR gate 128. On the other hand, in response to the servo gate signal S7, the AND gate 124 is opened, so that the write switching signal S8 is rendered high through the OR gate 127. As a result, the read/write circuit 116 is enabled to write the track servo signal generated by the servo signal generator 150 into the surface of the disc.

During the time period that the servo gate signal S7 is disabled, in response to the write gate signal S11 being at a low level, the AND gates 122 and 123 are closed, so that the write switching signal S8 has a low level (L), and consequently the writing operation of the read/write circuit 116 is disabled.

In the mode in which the sector ID is written into each track when formatting, as indicated in FIG. 7C, the write gate signal S11 becomes high immediately after the detection of the index and is maintained at a high level during one rotation of the magnetic disc. The flip-flop 114 is kept reset, because the servo write signal S14 is at a low level.

In this mode, the regions into which the servo signals have been previously written are protected and the ID signal is written into a region between the servo signal regions. More particularly, during the time that the servo gate signal S7 is at a high level, the flop-flop 114 delivers a low-level output signal, so that the AND gates 124 and 126 are closed, and accordingly the writing operation is disabled.

During the time interval that the servo gate signal S7 is at a low level, the AND gate 122 is opened in response to the write gate signal S11 and the inverted signal obtained by inverting the servo gate signal S7 by the inverter 121. In response to the output signal from the AND gate 122 and the inverted signal from the flip-flop 114, the AND gate 123 is opened. Therefore, the write switching signal S8 is high to enable the writing operation. Furthermore, in response to the inverted output signal from the flip-flop 114, the AND gate 125 is opened, so that the write data signal S12 is outputted from the AND gate 125. By inputting the ID data, the ID signal is written into the region between the servo signal regions. The region of the sector ID is defined in the leading portion of the succeeding data region.

During the time interval that the track data is written, the control is as indicated in FIG. 7D. As in the case of the time interval for writing the ID signal, the flip-flop 114 is reset. As in the case of the usual writing mode, the write signal S11 is high in each sector region into which a data signal must be written immediately after the writing of the ID signal.

In this manner, at each user's disc storage unit, the servo signal is written prior to the formatting of the sector ID on a raw disc which has not been formatted yet. Then, in response to the servo signal thus written, the positions of the tracks can be controlled. In the case of an application in which each unit defines a format, there exists the possibility of accessing to a disc on which the servo signal is written and the ID signal is written (formatted) by another disc storage unit, but in the case of writing data, if the writing is inhibited only by the servo gate signal S7, there is the possibility that even writing into a required data storage region is also inhibited due to the variation in rotational speed of the disc between the units and also due to the deviation of the detection timing of the index signal.

However, according to the present embodiment, in steps SW1 and SW2 in FIG. 6, when it is judged that no write gate signal S1 appears immediately after the detection of index and that the procedure is not in the servo write mode, the succeeding routine is not executed and the process is terminated without generating the servo gate signal S7. Therefore, in the data write mode indicated in FIG. 7D, the writing operation is enabled at any time.

In the data writing mode, the writing is conducted in synchronism with the address information in the ID region in the leading portion of each sector, as described above, so that no data is written into the servo signal region in the trailing portion of the sector (i.e., prior to the next sector ID).

Figure 8:
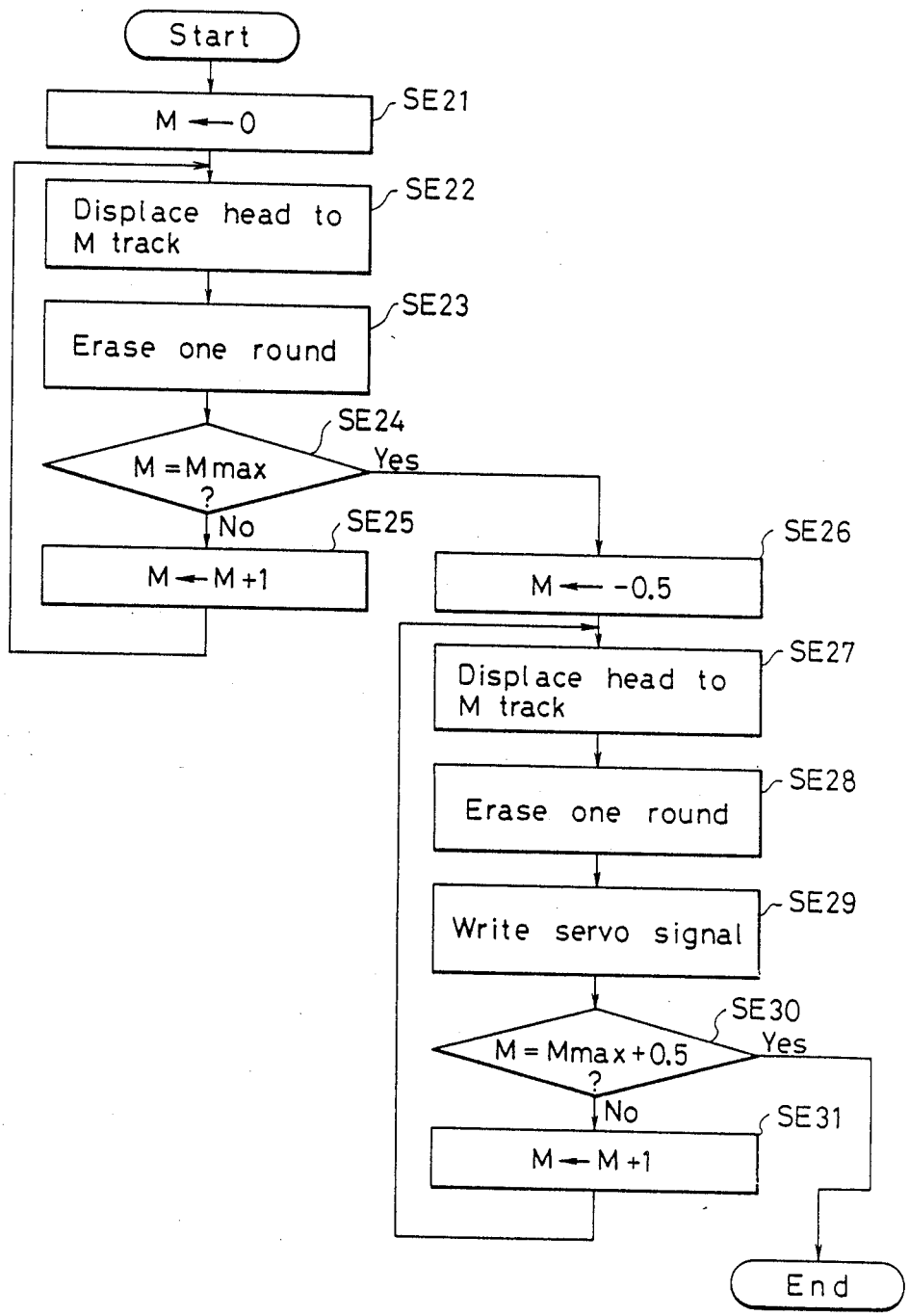
FIG. 8 is a flowchart illustrating another embodiment of the erasure process and the servo signal recording process.

After the data on the whole surface of the magnetic disc 9 has been erased by sequentially displacing the magnetic head 8 by 0.5 track pitch each time in the process shown in FIG. 5, the sequence proceeds to the sequence shown in FIG. 6, so that the servo signals are sequentially written, but the data erasure process and the servo signal writing process can be carried out as shown in FIG. 8.

First, in first step SE21, the content M of the counter 110 is cleared to zero. In step SE22, the magnetic head 8 is positioned at a track M; that is, in the first case of positioning the magnetic head 8, the magnetic head 8 is positioned at the outermost track T00 and then in second step SE23 erasure is made in one round (or plural rounds) while the head 8 is maintained at that position.

In step SE24, it is detected, whether or not M becomes the above-mentioned $M_{max}$. If M is less than $M_{max}$, the content of the counter 110 is incremented in step SE25 and then the sequence is returned to step SE22. In this way, a loop consisting of steps SE22-SE25 is executed repeatedly.

As a result, the magnetic head 8 is sequentially displaced by one track pitch at a time from the outermost track T00 to the innermost track and the erasure operation is carried out for one round (or plural rounds) at each track.

After the erasure of the innermost track is accomplished, so that $M=M_{max}$ is judged in step SE24, the sequence moves to step SE26. In this instant, as described above, the width of each track is of the order of ⅔ of one track pitch. Therefore, a non-erased region is left between the erasure regions of adjacent tracks.

In step SE26, −0.5 is set in the counter 110.

In next step SE27, the magnetic head 8 is displaced toward track M. More particularly, in the first case, the magnetic head 8 is located at the position of the −0.5 track, and is spaced apart from the outermost track T00 radially outwardly by 0.5 pitch track.

In step SE28, erasure is made for one round (or plural rounds) and in next step SE29, the servo signal is written. That is, in the first case, the servo signal is written in the region of track −0.5.

When the writing of the servo signal is performed after the detection of the index hole as in the processing in FIG. 6, that is, when the writing timings are adjusted as shown in FIGS. 7A and 7B, the succeeding writing of the ID signal can be carried out in a manner substantially similar to that described above with reference to FIG. 6, so that the ID data can be matched with the servo signal as shown in FIG. 7C.

In step SE30, it is judged whether or not the content M in the counter 111 has reached $M_{max}+0.5$. If M has not reached $M_{max}$ yet, the sequence is returned to step SE27 and the loop consisting of steps SE27-SE31 is executed repeatedly.

By the repeated execution of this loop, the non-erased regions between the adjacent tracks are sequentially erased from the outermost portion and then the servo signals are sequentially written in the sequentially erased regions.

When the servo signal has been written in the region spaced apart from the innermost track radially inwardly by one half track pitch, $M=M_{max}+0.5$ is detected in step SE30. Thus, the control is terminated.

According to the above-mentioned method in which first each track is erased and then while the regions on both sides of each track (that is, the region defined between the adjacent tracks) are erased, the servo signals are written in the erased region, the same result as that obtained in the embodiment described above with reference to FIG. 5 can be obtained, even though the sequences are different from each other. Therefore, the data previously recorded on the surface of the magnetic disc 9 can be completely erased without any portion which is left non-erased and then the servo signals can be written in the completely erased portion.

In a further embodiment of erasing the data on the surface of the magnetic disc 9 prior to the writing of the servo signal, while the magnetic head 8 is maintained in the erasure output state, the magnetic head 8 is continuously displaced, or without an interrupted displacement in a stepwise manner, from the position spaced apart by one track pitch from the outermost track T00 radially outwardly toward the region spaced apart by one half track pitch from the innermost track Tm radially inwardly. In this case, the displacement of the magnetic head 8 per one rotation of the magnetic disc 9 can be selected smaller than the track width.

Figure 9:
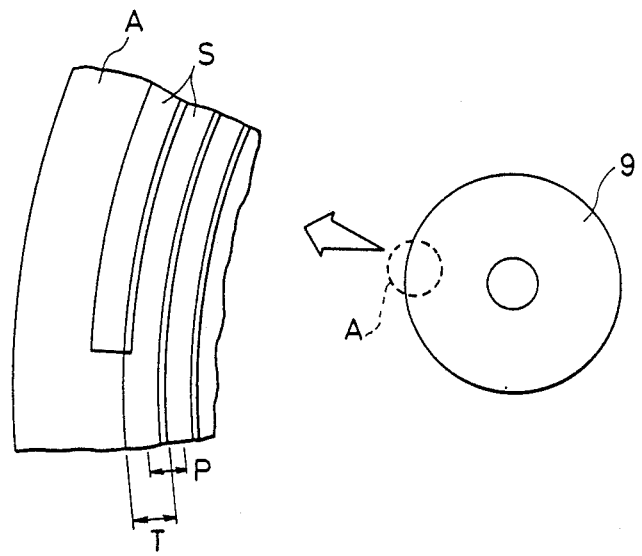
FIG. 9 is an explanatory diagram used to explain a further embodiment of the erasure process.

In this case, the magnetic head 8 traces a spiral locus on the surface of the magnetic disc 9 and, as indicated in the enlarged region A of the magnetic disc 9 in FIG. 9, the track pitch P of each erasure track S is smaller than the track width T. As a result, both sides of the erasure tracks overlap each other, so that the erasure can be completely made.

The above-described techniques in accordance with the present invention are not limited to a magnetic disc drive unit and may be equally applied to other disc drive units, such as an optical disc storage unit, when the above-mentioned servo signals must be written.

While in the above-described embodiment the slits of the encoder are shifted by ½ pitch to obtain output signals shifted by 180° from the each other, the present invention is not limited to this embodiment. The slits may be shifted by ¼ pitch to obtain output signals shifted by 90° from each other. Instead of the two-phase output signals as shown in FIG. 2B, multi-phase output signals can be used.

In the above-described embodiment, the encoder has been described as an optical encoder system, but it is to be understood that the present invention is not limited to an optical encoder and that any suitable position detection system such as a magnetic type position detection system may be used in the present invention. Furthermore, it is to be understood that the present invention is not limited to a rotary encoder and that a linear encoder securely mounted on the carriage also may be used.

Moreover, a linear stepping motor may be used as a drive means for displacing the magnetic head. Alternatively, the present invention is not limited to a stepping motor and any other suitable drive means such as a DC motor, a voice coil motor or the like may be used in the present invention.

As to the track servo control, in the above-described embodiment, the encoder mounted to the driving shaft of the motor is not used in the case of writing the ID signal and in the case of usual accessing to data, but in the initial stage of the head positioning instead of monitoring the number of steps of the motor, the encoder mounted to the drive shaft of the motor may be used to control the position of the magnetic head. In the case of using a DC motor, the encoder mounted to the drive shaft of the motor is used for determining an initial position.

While in the above-described embodiment, the system in which the servo information is written in each sector as shown in FIG. 3 is employed, it is to be understood that the manner of writing the track servo information in the present invention is not limited to such a sector servo system and that various methods for writing the servo information may be used in the present invention. For instance, the track servo information may be written only in the leading portion of each track.

Furthermore, instead of the servo information in the form of the signals having two different frequencies, signals having one or the same frequency may be recorded with a predetermined time difference from each other.

Furthermore, while in the above-described embodiment, the timers 111 and 112 are described as discrete elements, it is to be understood that they are incorporated in the central processing unit 103. Moreover, these timers may be implemented by the software of the central processing unit 103. In addition, while in the above-described embodiment, the servo gate signal S7 is controlled by the software as indicated in steps SW6 and SW8 in FIG. 6, the servo write mode may be controlled by hardware elements.

Furthermore, instead of the simultaneous formatting of the servo write signal and ID write signal, they may be formatted independently of each other. In the case of a disc storage unit in which interchangeability with an open loop type unit is required, the servo write signal may be eliminated.

Further, the index detection can be performed, in addition to utilization of the index hole on a disc, by detecting a magnet or reflector on the spindle on the side of a disc drive unit.

As described above, in the case of a disc storage unit of the type in which information is recorded in each track having a predetermined width and a predetermined track pitch, there is provided control means which erases data on the surface of the disc at a track pitch narrower than the width of each track, so that the information recorded on the surface of the disc can be completely erased and then the servo signals can be written into the thus completely erased portion. Therefore, adverse effects caused by information left not erased can be eliminated, so that the reliability of the disc storage unit can be improved.

Furthermore, according to the present invention, the drive means for displacing the recording head has encoder means for generating the servo information in response to which the recording head is displaced to a desired track position, and in case of formatting a disc including the recording of the servo signal, the position of the recording head is controlled by using the information generated by the encoder means and then the servo information signal is written on the disc. Therefore, in each unit used by each user, the servo signal can be written with a high accuracy, so that data can be recorded or reproduced with a high degree of accuracy in accordance with the written servo signal. As a result, interchangeability of recorded or reproduced data can be considerably improved and the cost of the recording medium can be reduced.

In addition, the present invention comprises means for generating a servo gate signal which is enabled or disabled at a predetermined timing in response to a predetermined position of the rotation of a magnetic disc. In the mode of writing the servo signal, the servo signal is written during the time interval that the servo gate signal is enabled and the sector ID signal is written during the time interval that the servo gate signal is disabled. On the other hand, in the data writing mode, the writing of data is permitted regardless of the state of the servo gate signal Therefore, even if a disc is formatted by a different disc storage unit, the position of each track can be controlled with a high accuracy in response to the servo signal without causing any trouble and adverse effect on the writing of data due to the difference between the disc driving conditions. Furthermore, by using the servo signal, useless regions such as guard bands between the adjacent tracks can be decreased, so that data can be stored at a high data storage density.

What is claimed is:

1. A disc storage unit, comprising:
    a recording head for writing data into a rotating disc-shaped recording medium at a plurality of concentric tracks having a constant track pitch and for reading and erasing data stored thereon;
    carrying means for carrying said recording head in the radial direction of said recording medium;
    detection means for detecting the position of said recording head in said radial direction of said recording medium;
    servo signal recording means for recording through said recording head a track servo signal for positioning said recording head at one of the concentric tracks;
    servo signal recording control means for activating said servo signal recording means when said recording head is being carried by said carrying means and it is judged that said recording head is positioned at a position between adjacent tracks in response to the output from said detection means; and
    erasure control means for erasing data on said recording medium by said recording head prior to the writing of said servo signal, said erasure control means including means for controlling said carrying means to sequentially displace said recording head by a distance that is smaller than the width of each track, so that said recording head erases the data on said recording medium.

2. A disc storage unit as claimed in claim 1, wherein said recording medium is in the form of a magnetic disc and said recording head is in the form of a magnetic head.

3. A disc storage unit as claimed in claim 1, wherein said carrying means comprises a motor, wherein said detection means comprises an encoder which is mounted to the drive shaft of said motor and which has slits having a pitch corresponding to the pitch of said tracks, a photosensor through which said slits of said encoder pass, and means having a plurality of further slits which are disposed in front of a light receiving portion of said photosensor and which are displaced from each other in the direction of the passage of said slits of said encoder, and wherein said servo signal recording means detects each region between said adjacent tracks in accordance with variations in the level of the output signal derived from said light receiving portion when the slits of said encoder pass by said plurality of further slits.

4. A disc storage unit, comprising:
 a recording head for writing data into a rotating disc-shaped recording medium at a plurality of concentric tracks having a constant track pitch, and for reading and erasing data stored thereon;
 carrying means for carrying said recording head in the radial direction of said recording medium;
 detection means for detecting the position of said recording head in said radial direction of said recording medium;
 servo signal recording means for recording through said recording head a track servo signal for positioning said recording head at one of the concentric tracks;
 servo signal recording control means for activating said servo signal recording means when said recording head is being carried by said carrying means and it is judged that said recording head is positioned at a position between adjacent tracks in response to the output from said detection means; and
 erasure control means for erasing data on said recording medium by said recording head prior to the writing of said servo signal, said erasure control means including means for controlling said carrying means to sequentially carry said recording head at predetermined positions,
 wherein after said erasure control means controls said carrying means to sequentially erase all of said tracks, said erasure control means controls said carrying means to place said magnetic head at a region between said adjacent tracks to erase the data in said region and thereafter said servo signal recording control means writes said servo signal while said magnetic head is maintained in said region.

5. An apparatus for recording information on a disc shaped recording medium, comprising:
 a head for writing signals into said recording medium at a plurality of concentric tracks having a constant track pitch, and for reading and erasing signals recorded thereon;
 carrying means for carrying said head in the radial direction of said recording medium;
 detecting means for detecting the position of said head carried by said carrying means on said recording medium;
 erasure control means for controlling said carrying means in response to the position detected by said detecting means in the case of erasure of data stored on said recording medium in such a way that said recording head is carried to regions on and between adjacent tracks; and
 record control means for controlling said carrying means in response to said position detected by said detecting means and for controlling said head to record a tracking servo signal after said erasure is completed.

6. An apparatus for recording information on a disc shaped recording medium as claimed in claim 5, wherein said recording medium is in the form of a magnetic disc and said head is in the form of a magnetic head.

7. An apparatus for recording information on a disc shaped recording medium as claimed in claim 5, further comprising control means for controlling said carrying means in response to said tracking servo signal and for controlling said head to record information on said recording medium, after recording of said tracking servo signal is completed.

8. An apparatus for recording information on a disc shaped recording medium as claimed in claim 5, wherein said erasure control means controls said carrying means to carry said recording head at a pitch smaller than the width of each track, so that said recording head erases the data on said recording medium.

9. An apparatus for recording information on a disc shaped recording medium, comprising:
 a head for writing signals into said recording medium at a plurality of concentric tracks having a constant track pitch, and for reading and erasing signals recorded thereon;
 carrying means for carrying said head in the radial direction of said recording medium;
 detecting means for detecting the position of said head carried by said carrying means on said recording medium;
 erasure control means for controlling said carrying means in the case of erasure of data stored on said recording medium; and
 control means for controlling said carrying means and said head in a first mode and a second mode, said first mode being a mode in which said carrying means is controlled in response to said position detected by said detecting means and said head is controlled to record a tracking servo signal, after said erasure is completed, and said second mode being a mode in which said carrying means is controlled in response to said tracking servo signal and said head is controlled to record ID information used for distinguishing respective sectors from each other on a track, after recording of said tracking servo signal is completed.

10. An apparatus for recording information on a disc shaped recording medium as claimed in claim 9, wherein said recording medium is in the form of a magnetic disc and said head is in the form of a magnetic head.

11. An apparatus for recording information on a disc shaped recording medium as claimed in claim 9, wherein said control means drives said carrying means to carry said head until said head reaches a predetermined position detected by said detecting means.

* * * * *